US006707927B1

(12) United States Patent
Kita et al.

(10) Patent No.: US 6,707,927 B1
(45) Date of Patent: Mar. 16, 2004

(54) STEGANOGRAPHIC SYSTEM, METHOD, PROGRAM AND STORAGE MEDIUM THEREFOR

(75) Inventors: Kazumasa Kita, Yokohama (JP); Hiroshi Yoshiura, Tokyo (JP); Yutaka Kurosu, Yokohama (JP); Miki Tanaka, Yokohama (JP); Shinobu Eikawa, Yokohama (JP); Tomoyuki Kaji, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/542,295

(22) Filed: Apr. 4, 2000

(30) Foreign Application Priority Data

Apr. 5, 1999 (JP) .............................. 11-097291

(51) Int. Cl.[7] .................................. G06K 9/00
(52) U.S. Cl. ................. 382/100; 382/232; 380/277
(58) Field of Search ................. 382/100, 232; 380/219, 277, 278, 279; 713/716

(56) References Cited

U.S. PATENT DOCUMENTS

| 5,721,788 A | * | 2/1998 | Powell et al. ........... 382/100 |
| 6,259,801 B1 | * | 7/2001 | Wakasu ................. 382/100 |
| 6,332,194 B1 | * | 12/2001 | Bloom et al. ........... 713/176 |
| 6,418,232 B1 | * | 7/2002 | Nakano et al. .......... 382/100 |
| 6,466,209 B1 | * | 10/2002 | Bantum ................ 345/589 |
| 6,519,351 B2 | * | 2/2003 | Kimura et al. .......... 382/100 |

* cited by examiner

Primary Examiner—Samir Ahmed
Assistant Examiner—Anand Bhatnagar
(74) Attorney, Agent, or Firm—Antonelli, Terry, Stout & Kraus, LLP

(57) ABSTRACT

There is provided a steganographic system which can dispense with an original image during extraction of watermark by determining a position at which an optimum space dependent physical quantity is embedded as a watermark complying with an image such that the picture quality can be prevented from being deteriorated, embedding watermark information in the image, generating information such as watermark embedding position information and receiving a watermark embedded image and watermark embedded position information to extract watermark information.

16 Claims, 15 Drawing Sheets

EXAMPLE OF PHYSICAL QUANTITY
CHANGE RATE FOR PIXEL x :
$|f(a)-f(x)| + |f(b)-f(x)|$
$+ |f(c)-f(x)| + |f(d)-f(x)|$
WHERE f(x) IS PHYSICAL QUANTITY
FOR PIXEL x

FIG.13

1301 — 1302
CORRESPONDENCE MANAGEMENT

| WATERMARK EMBEDDED IMAGE FILE NEME | POSITION INFORMATION |
|---|---|
| GAZOU1.JPG | $S_1$ |
| GAZOU2.GIF | $S_2$ |
| GAZOU3.BMP | $S_3$ |

1401 — 1402
CORRESPONDENCE MANAGEMENT

| WATERMARK EMBEDDED IMAGE FILE NEME | POSITION INFORMATION, THRESHOLD FUNCTION, PHYSICAL QUANTITY, |
|---|---|
| GAZOU1.JPG | $S_1, h_S1, f_A1$ |
| GAZOU2.GIF | $S_2, h_S2, f_A2$ |
| GAZOU3.BMP | $S_3, h_S3, f_A3$ |

1501 — 1502
CORRESPONDENCE MANAGEMENT

| WATERMARK EMBEDDED IMAGE FILE NEME | POSITION INFORMATION, THRESHOLD FUNCTION, PHYSICAL QUANTITY, INITIAL CIRCUMFERENCE QUANTITY |
|---|---|
| GAZOU1.JPG | $S_1, h_S1, f_A1, F_{SO}1$ |
| GAZOU2.GIF | $S_2, h_S2, f_A2, F_{SO}2$ |
| GAZOU3.BMP | $S_3, h_S3, f_A3, F_{SO}3$ |

⋮

STEGANOGRAPHIC SYSTEM, METHOD, PROGRAM AND STORAGE MEDIUM THEREFOR

CROSS REFERENCE TO RELATED APPLICATIONS

The present application is related to patent application Ser. No. 09/274,103 entitled "Digital Watermark Image Processing Method" filed by J. Taguchi et al on Mar. 23, 1999.

BACKGROUND OF THE INVENTION

The present invention relates to steganographic system, method, program and storage medium therefor and more particularly, to steganographic system, method, program and storage medium therefore which are useful for the case in which digital contents such as images are distributed and circulated through an internet.

Recently, with development of internet, digital contents such as images have been sold and circulated frequently. Under the circumstances, for the sake of protecting copyright of digital contents especially represented by images, a contrivance has been offered, according to which writer information or consumer's information is embedded in an original image by utilizing a steganographic technology for visible watermark or invisible watermark to ensure that the writer of the original image or the consumer can be identified even when the image is spread illegally.

The conventional method for invisible steganography has been mainly classified into a method of embedding a watermark in a space dependent physical quantity or a parameter optically representing a pixel and a method of embedding a watermark in a frequency-domain dependent quantity. The frequency-domain dependent quantity can be obtained by converting the space dependent physical quantity into a frequency through the use of, for example, wavelet transform. Embedding of the watermark in the physical quantity or the frequency dependent quantity can be implemented by adding designated watermark information added with redundancy to a value of physical quantity or a value of frequency dependent quantity on a pixel, that is, correcting the value of physical quantity or the value of frequency dependent quantity and embedding resulting information in the image. The watermark embedded as a fluctuation in the frequency-domain dependent quantity can be subjected to inverse transform so that the original physical quantity may be recovered.

In the method of embedding a watermark in a space dependent physical quantity, it is general to define brightness or color information assigned to each pixel of an image as a physical quantity and embed a watermark in the physical quantity.

U.S. Pat. No. 5,721,788 entitled "Method and System for Digital Image Signature" discloses a method, according to which watermarks are embedded in a pixel at which a physical quantity such as brightness or color information becomes the maximal or minimal and in its neighboring position and when the watermarks are to be extracted, the pixel at which the physical quantity is the maximal or minimal is determined from an image embedded with the watermarks to identity the watermark embedded positions and the watermark information is read out in accordance with the identified watermark embedded positions. The above method utilizes such a nature that at a location where the physical quantity, for example, brightness on the pixel of the image changes greatly, even when the physical quantity on the pixel is changed to some extent, eyes of human are insensitive to the change. In this method, however, when the number of pixels at which the physical quantity becomes the maximal or minimal is restricted, the amount of embedded watermark information is small. Besides, if a watermark is embedded at a location where the change in brightness is small, then picture quality will sometimes be degraded. In addition, this conventional method faces difficulties in embedding a watermark at a portion where the physical quantity changes steeply.

H. Yoshiura et al., "Steganography and its Applications", Hitachi Review Vol. 80, No. 7, pp. 511 to 516, published in 1998 by Hitachi Review-sha discloses a method for preventing degradation of picture quality as far as possible by embedding a watermark at an optimal location in consideration of characteristics of an original image. This conventional method takes into consideration such a nature that human eyes are insensitive to a change of physical quantity at a portion where the physical quantity changes steeply but are sensitive to a change of outline. In order to conserve the outline, an optimal portion where a physical quantity changes steeply and so a change of the physical quantity is not discernible by human eyes is extracted and watermark information is embedded at the extracted portion. Through this, the watermark can be embedded at the optimal position in consideration of characteristics of an original image without degrading picture quality. This conventional method, however, requires the original image for the sake of identifying the watermark embedded position and when extracting the watermark, it needs to identify the watermark embedded position by comparing the original image with an image embedded with the watermark (a watermark embedded image) and by preparing a differential image. When the original image is necessary, a large volume memory device needs to be provided to fully take custody of the original image. In addition, since selling via internet is generally not proceeded with by an owner of the original image but is generally carried out by an agency, the agency encounters the difficulty of taking custody of the original image for the purpose of extracting the watermark.

SUMMARY OF THE INVENTION

An object of the present invention is to provide steganographic system, method, program and storage medium therefor which can optimize the position where a watermark is embedded for the sake of minimizing deterioration of image and which can dispense with an original image during extraction of the watermark.

Another object of the invention is to provide a steganographic technique which can reduce the amount of information in the custody to a fraction or several tenths of that in the case of the method which conserves the original image.

Still another object of the invention is to provide a steganographic technique which can permit even a selling agency of image to hold information for watermark extraction, thereby largely contributing to actual business activity of circulating and selling digital contents via internet.

According to the present invention, there is provided an information processing system comprising an information management table for storing watermark position information embedded in an image to be embedded with a watermark in correspondence to the image, and a controller for controlling at least one of watermark embedding position and extraction positions in the image on the basis of the position information in the informa- tion management table.

The controller can determine the embedding position by avoiding pixel positions corresponding to the maximal and minimal values of a physical quantity owned by a pixel of the image.

According to another aspect of the present invention, a steganographic system for embedding a watermark in an input image comprises watermark embedding position determining means for determining a watermark embedding position complying with the input image, watermark embedding means for receiving embedding position information from the watermark embedding position determining means to embed the watermark in the input image, and management means for managing the embedding position information.

The management means manages the embedding position information by making the correspondence of a watermark embedded image corresponding to the input image with the embedding position information.

A steganographic system for embedding a watermark in an input image comprises watermark embedding position determining means for determining a watermark embedding position complying with the input image, watermark embedding intensity determining means for determining a watermark embedding intensity complying with the input image, watermark embedding means for receiving embedding position information from the watermark embedding position determining means and embedding intensity information from the watermark embedding intensity determining means to embed the watermark in the input image, and management means for managing the correspondence relation between a watermark embedded image corresponding to the input image and the embedding position information.

A steganographic system for embedding a watermark in an image comprises watermark embedding position determining means for determining a watermark embedding position complying with the image and a threshold function concerning the embedding position, watermark embedding means for receiving embedding position information from the watermark embedding position determining means to embed the watermark in the image, and means for managing the embedding position information and the threshold function.

A steganographic system for embedding a watermark in an image comprises watermark embedding position determining means for determining a watermark embedding position complying with the image and a physical quantity concerning the embedding position, watermark embedding means for receiving embedding position information from the watermark embedding position determining means to embed the watermark in the image, and means for managing the embedding position information and the physical quantity.

A steganographic system for extracting a watermark of a watermark embedded image comprises management means for managing the watermark embedded image and embedding position information by making correspondence therebetween, and extraction means for receiving the watermark embedding position information from the management means to extract the watermark from the watermark embedded image.

A steganographic method for embedding a watermark in an input image comprising the steps of analyzing the input image, embedding the watermark in the input image in accordance with a result of analysis, and managing information for identifying an embedding position.

A steganographic method for embedding a watermark in an input image comprises the steps of determining a watermark embedding position complying with the input image, receiving information of the embedding position to embed the watermark in the input image, and managing the embedding position information.

A steganographic method for extracting a watermark of a watermark embedded image comprises the steps of managing the watermark embedded image and watermark embedding position information by making correspondence therebetween, and receiving the managed watermark embedding position information to extract the watermark from the watermark embedded image.

There is also provided a storage medium for storing a program realizing the function implemented by the aforementioned systems and methods.

BRIEF DESCRIPTION OF THE DRAWINGS

FIG. 13 shows an example of correspondence management.

FIG. 14 shows another example of correspondence management.

FIG. 15 shows still another example of correspondence management.

DESCRIPTION OF THE EMBODIMENTS

The present invention pertains to a method of extracting a watermark, without resort to an original image, from an image which is minimized in deterioration due to watermark embedding by using watermark embedding position information alone, a set of position information, threshold function concerning a watermark embedding position and physical quantity or a set of position information, threshold function concerning a watermark embedding position, physical quantity and initial physical quantity so as to embed a space dependent physical quantity, as a watermark, in the image.

Figure 1:
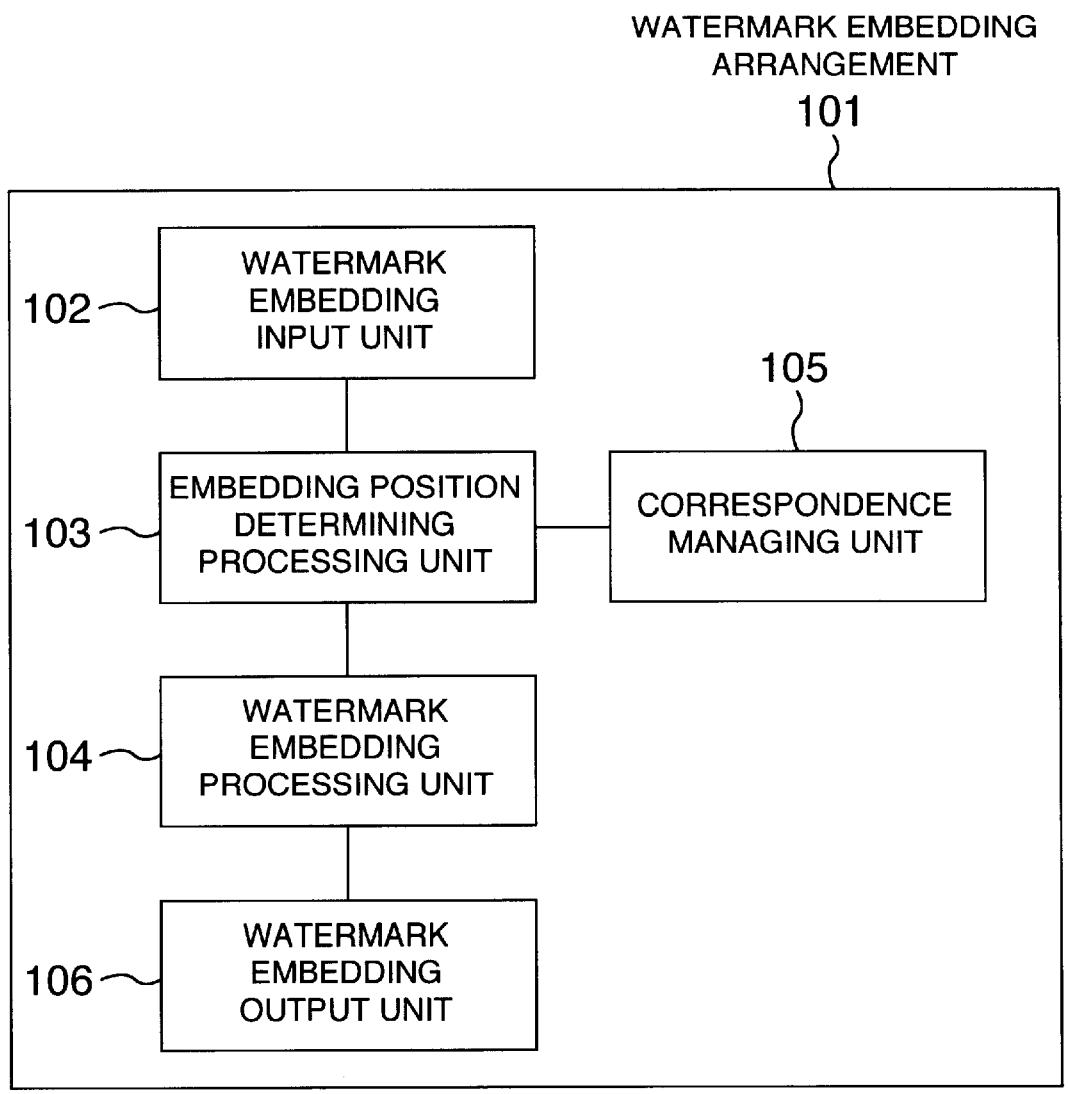
FIG. 1 is a diagram showing an embodiment of a watermark embedding arrangement in a steganographic system according to the invention.

Referring to FIG. 1, there is illustrated an embodiment of a watermark embedding arrangement in a steganographic system according to the invention. The watermark embedding arrangement 101 comprises a watermark embedding input unit 102, an embedding position determining unit 103, a watermark embedding processing unit 104, a correspondence managing unit 105, and a watermark embedding output unit 106. The watermark embedding input unit 102 receives inputs of original image and watermark information and digitizes and holds the information. The embedding position determining processing unit 103 determines a position in a watermark embedded image from the digital original image and watermark information fetched by the input unit as well as a parameter inputted by a user and adapted to designate whether the picture quality preference or the durability preference prevails. The watermark embedding processing unit 104 receives the digital position information and watermark information to calculate information such as brightness or color necessary for preparation of the watermark embedded image. The position information will be used to identify the watermark embedding position in place of the original image during watermark extraction to be described later. The correspondence managing unit 105 manages the correspondence of the original image with information concerning the watermark embedded position and will be used to identify the position information during extraction of the watermark from the water mark embedded image to be described later. The watermark embedding output unit 106 delivers the watermark embedded image.

Figure 2:
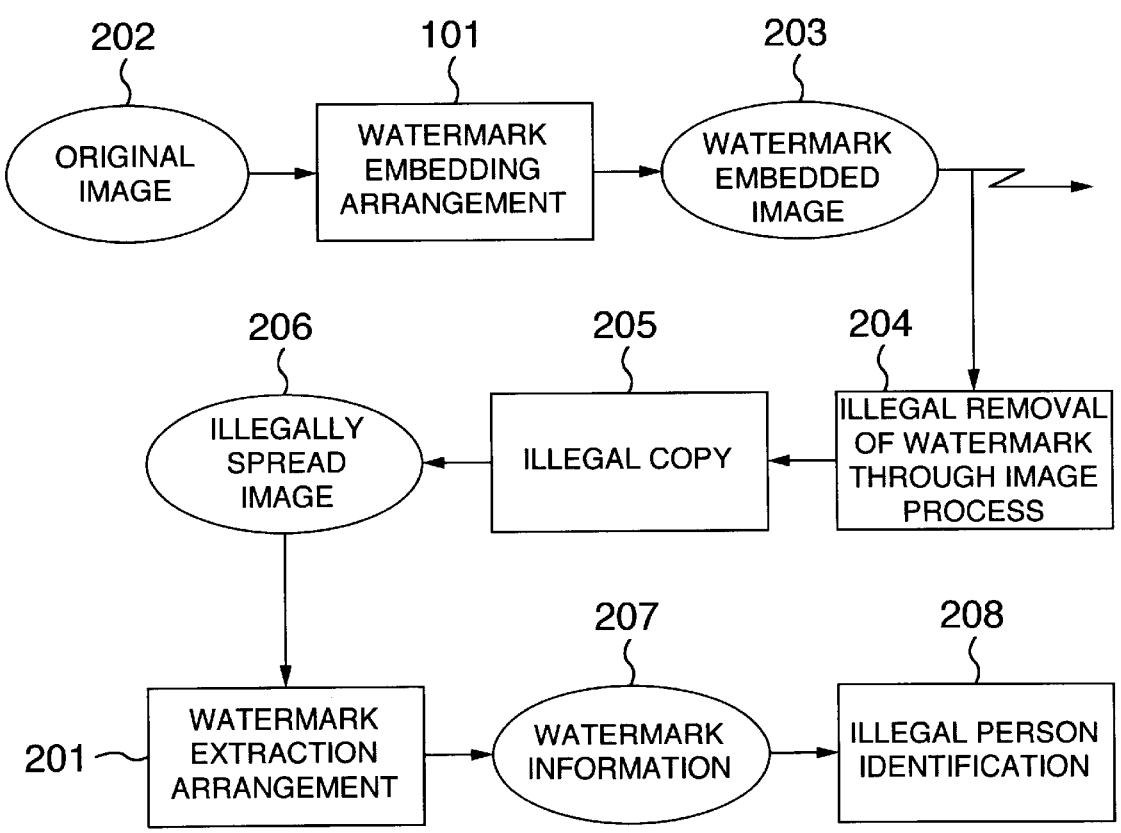
FIG. 2 is a diagram showing a contrivance for protecting a copyright by identifying an unauthorized person when a watermark embedded image is spread illegally.

Referring to FIG. 2, there is illustrated, in flow chart form, a contrivance for copyright protection which identifies an unauthorized person in case a watermark embedded image is copied illegally. In addition to the watermark embedding arrangement 101, a watermark extraction arrangement 201 is shown. The watermark embedding arrangement 101 receives an input of original image 202 and delivers a watermark embedded image 203. The watermark embedded image is distributed via a circulation route such as internet so as to be utilized. According to a way to utilize, the image is subjected to an image process such as enlargement/reduction or change of the tone of color. In step 204, a watermark is illegally removed through an image process. In step 205, the image subject to the image process is illegally copied. The watermark extraction arrangement 201 receives the image 206 suspected to be an illegal copy so as to extract watermark information 207. In step 208, by detecting the watermark information in the form of a legal consumer's ID of the image precedently embedded in the watermark embedding arrangement 101, the unauthorized or illegal person is identified.

Figure 3:
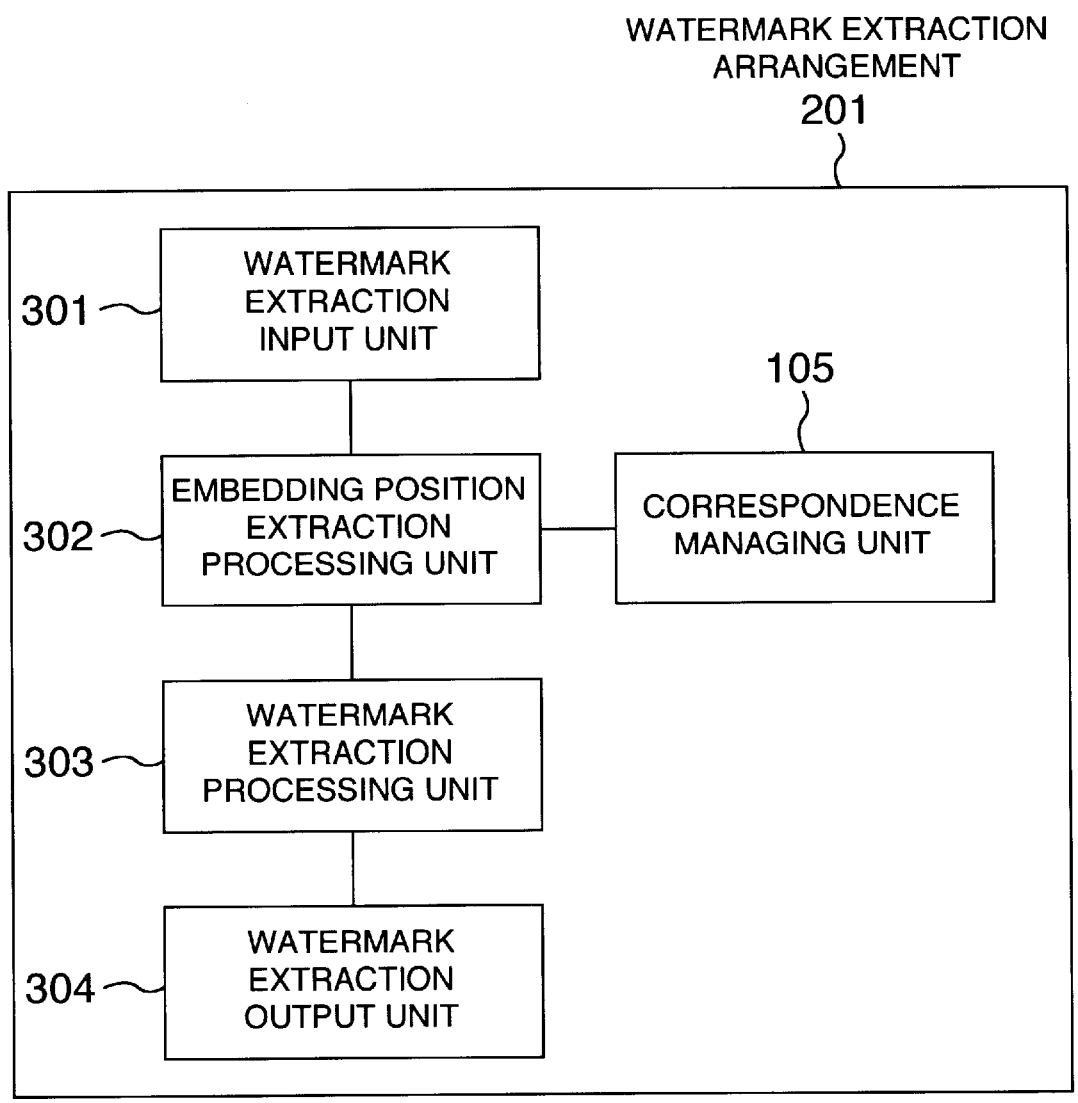
FIG. 3 mates with FIG. 1 to show an embodiment of watermark extraction in the steganographic system according to the invention.

FIG. 3 mates with FIG. 1 in an embodiment of the construction of the steganographic system according to the invention, showing the construction of a watermark extraction arrangement 201. As shown, the watermark extraction arrangement 201 comprises a watermark extraction input unit 301, an embedding position extraction processing unit 302, a watermark extraction processing unit 303, a watermark extraction output unit 304 and the correspondence managing unit 105. The watermark extraction input unit 301 receives inputs of watermark embedded image and position information and digitizes and holds them. The digital image and information are held in the unit 301. The embedding position extraction processing unit 302 transfers the inputted embedding position information to the watermark extraction processing unit 303. In this phase, position information corresponding to the watermark embedded image is identified by the correspondence managing unit 105. The watermark extraction processing unit 303 receives the embedding position information from the embedding position extraction processing unit 302 and calculates watermark information. The watermark extraction output unit 304 delivers the thus obtained watermark information.

Figure 4:
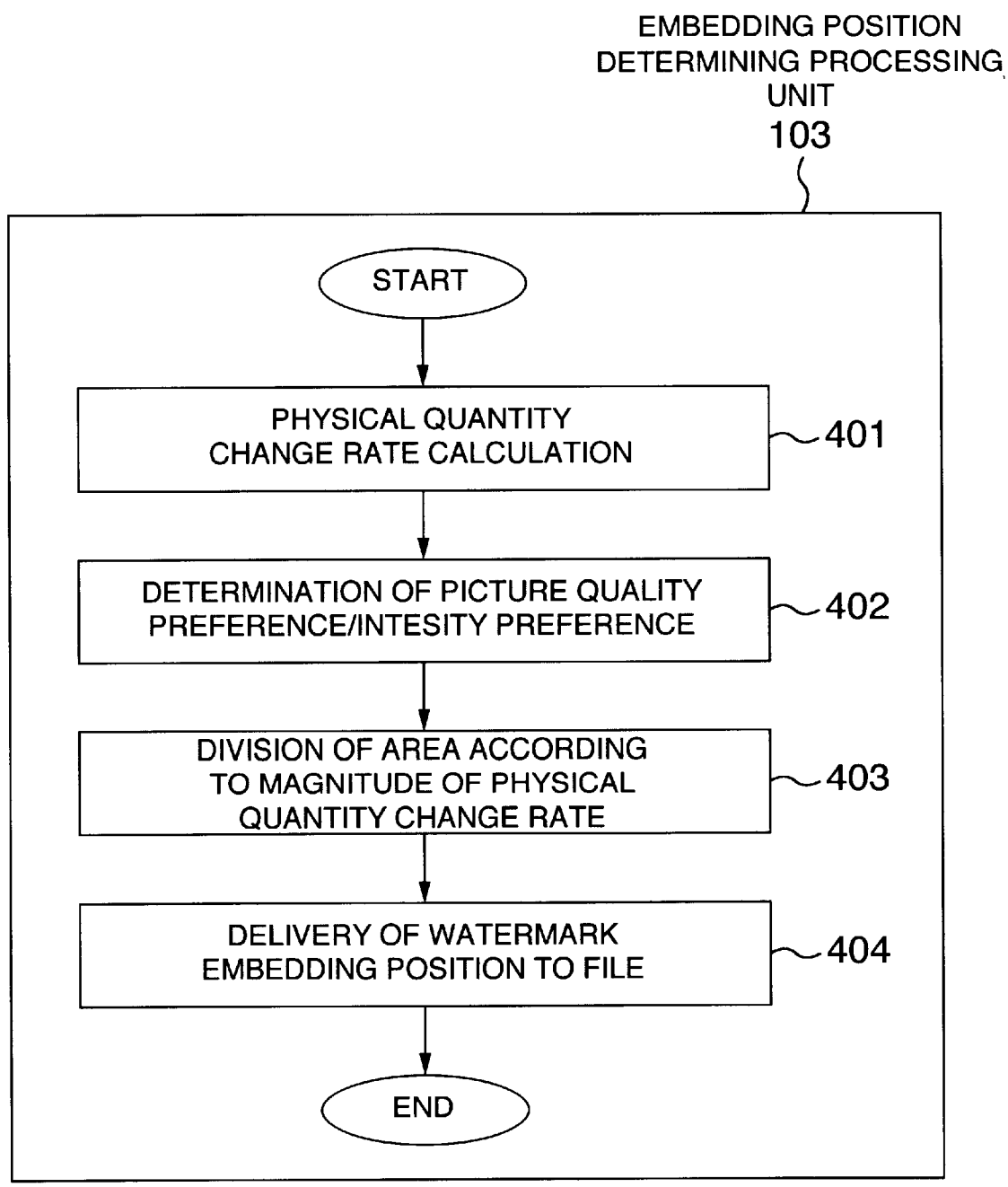
FIG. 4 shows details of an embedding position determining process.

Referring now to FIG. 4, details of a process in the embedding position determining processing unit 103 will be described. In order to determine a watermark embedding position, rates of change of physical quantities of individual pixels in an original image are first determined in step 401. Where the number of pixels in the original image is N, N rates of change of physical quantities are determined when the whole of image is treated as an embedding target. But when a watermark is embedded in only a part of the image, change rates for pixels included in the part are determined. The rate of change of physical quantity indicates the degree of change in physical quantity near a pixel. An embodiment of determination of the rate of change of physical quantity will be described later with reference to FIG. 5.

It is determined in step 402 in accordance with a parameter inputted by a user whether the picture quality preference or intensity preference prevails during embedding of watermark. When determining whether a watermark is embedded in individual pixels of the image, the system determines a search region range including one watermark as a comparison range used for comparing rates of change of physical quantities of the individual pixels.

The picture quality preference implies that deterioration in the picture quality is suppressed to such an extent that even when a watermark embedded image is directly compared with the original image, human eyes can hardly discern the difference. To this end, the watermark is embedded sequentially in order of steepness of the physical quantity change rate, starting with a portion of the original image where the physical quantity change rate is the steepest and so, the comparison range of physical quantity change rates of pixels which is necessary to determine the order of pixels to be embedded with watermark is required to cover the whole region.

In the picture quality preference, pixels to be embedded with watermark are sometimes concentrated to one portion. Accordingly, in the case of intensity preference, with the aim of dispersing pixels embedded with watermark over the whole of image as far as possible, physical quantity change rates in one localized range are compared with those in another localized range. In this case, watermark embedding is carried out in respect of the individual localized ranges. An image expected either to cope with an image process such as partial cut-out for illegally accessing a part of the image or to be durable against the above process needs to undergo the intensity preference. In the case of picture quality preference, the search region range covers the overall area including all pixels of the original image. In the case of intensity preference, the overall area is divided into n partial ranges which are used as search region ranges, where n is integer larger than 1 and determined by the degree of the intensity preference. For the overall area, n=1 stands. The search region range will be used in step 403 to be described below.

Let a rule indicating whether a pixel is embedded with a watermark be defined in the step 403. In each of the n divided partial ranges, the degree of change or the rate of change of physical quantity for one pixel is compared with that for another pixel and pixels which can be confined within X/n bytes are sequentially picked up in order of magnitude of the change degree or change rate, that is, in order of steepness of the change of physical quantity, where X represents the number of bytes for all pixels to be embedded with watermark. Usually, the rule depends on the algorithm of watermark, the degree of deterioration in picture quality desired in watermark embedding and the intensity. Further, as will be described later with reference to FIG. 7, the rule is also restricted by the amount of information to be embedded and the manner of determination of parity bits. It is now assumed that "1" is assigned to a picked-up pixel. This assignment is indicated by S(x)=1, where x denotes a pixel. A pixel which fails to be picked up is indicated by S(x)=0. Through this, rule S(x) for an image concerned is defined. The rule S(x) is a mapping for indicating whether a pixel is embedded with a watermark. This mapping is implemented from all of the pixels to a set {0,1}.

By using the mapping S(x), whole pixels embedded with watermark and whole pixels not embedded with watermark will be defined. Assuming that the whole of pixels of the original image is G, a set A indicated by equation (1) expresses the whole pixels embedded with watermark.

$$A=\{x \epsilon G:S(x)=1\} \quad (1)$$

Besides, a set A' indicated by equation (2) expresses the whole pixels not embedded with watermark.

$$A'=\{x \epsilon G:S(x)=0\} \quad (2)$$

In step 404, the watermark embedding position is delivered to a file. The watermark embedding position is indicated by S given by equation (3), where S(i) corresponds to an i-th pixel in the original image.

$$S=\{S(1)S(2)\ldots S(N)\} \quad (3)$$

The position information S is delivered to the file.

Figure 5:
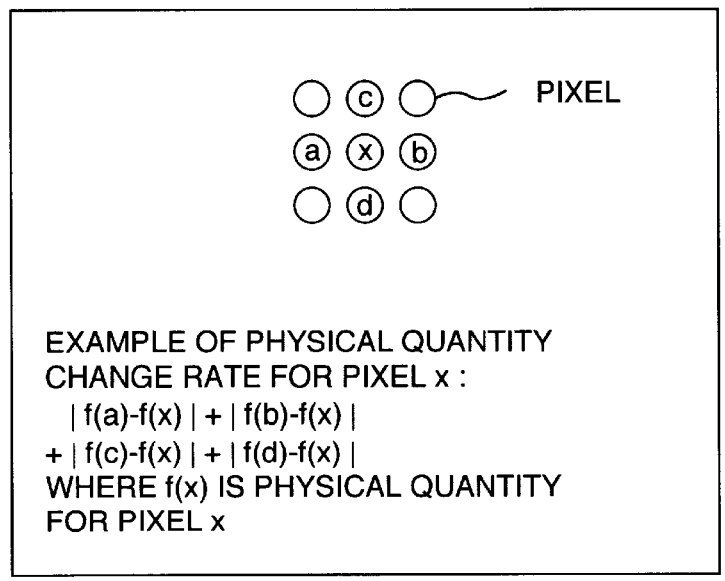
FIG. 5 is a diagram showing a specified embodiment of calculation of the rate of change of a physical quantity in respect of each pixel.

Referring to FIG. 5, there is illustrated a specified embodiment of calculation of the rate of change of physical quantity in respect of each pixel. When pixels on the left side of, on the right side of, above and below a pixel x are represented by a, b, c and d and f(x) represents a physical quantity of the pixel x, the degree of change of physical quantity is given by expression (4).

$$|f(a)-f(x)|+|f(b)-f(x)|+|f(c)-f(x)|+|f(d)-f(x)| \quad (4)$$

Figure 6:
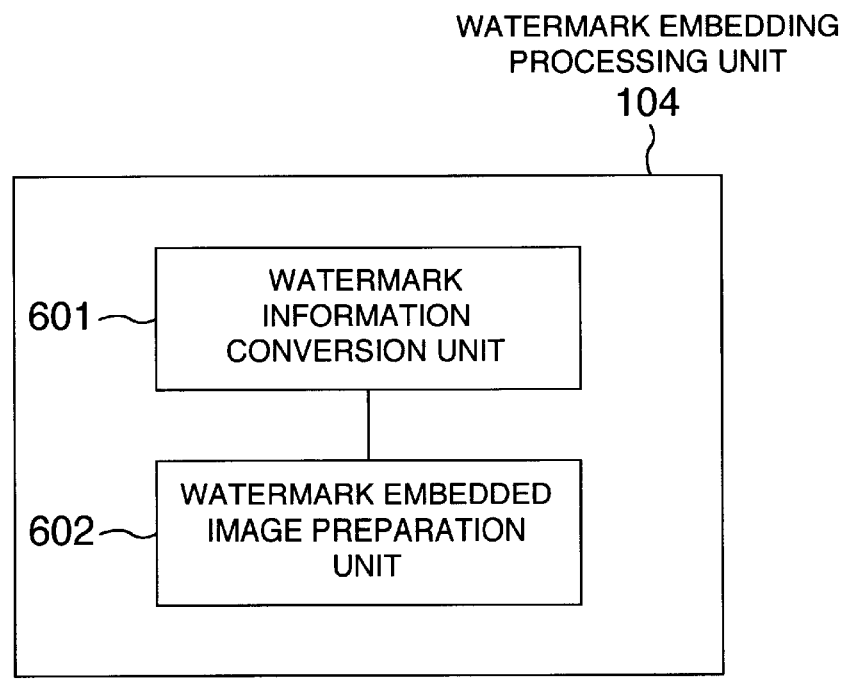
FIG. 6 is a diagram showing the construction of a watermark embedding processing unit.

Referring to FIG. 6, details of the watermark embedding processing unit 104 will be described. The watermark embedding processing unit 104 comprises a watermark information conversion unit 601 and a watermark embedded image preparation unit 602. The watermark embedding processing unit 104 receives inputs of watermark information and position information S. The watermark information conversion unit 601 receives an input of the watermark information and when embedding the information in the original image, converts the information into an expanded form considering redundancy. The watermark embedding image preparation unit 602 receives the converted watermark information to correct the physical quantity on the pixel and returns a value of corrected physical quantity to the original image.

Figure 7:
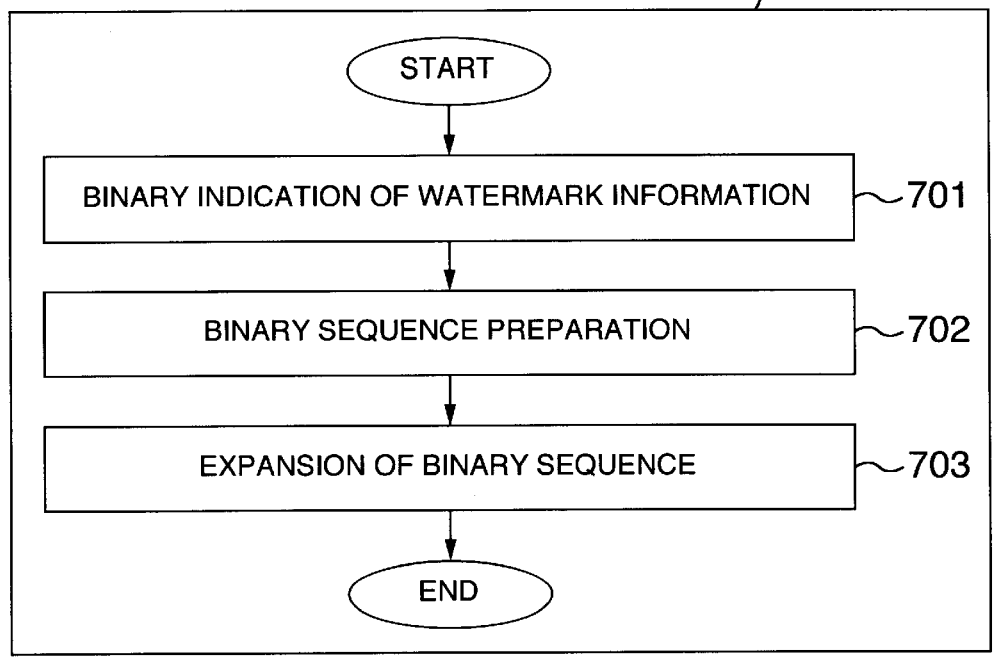
FIG. 7 shows details of watermark information conversion.

Referring to FIG. 7, a process in the watermark information conversion unit 601 will be described. As an example, the watermark information to be embedded is a sequence of numerals or symbols such as "2936104. Here, a numeral sequence is considered to be included in a symbol sequence.

In step 701, individual symbols (here numerals) in a symbol sequence indicative of the watermark information are indicated by binary expression. In the case of a system which uses 10 numerals 0 to 9 and 52 capital and small alphabetical letters in total, 6 bits suffice to identify 62 letters. When a larger number of symbols are desired to be identified, the number of bits may be increased. Then, the symbols are expressed herein by 6 bits in binary expression as indicated in expression (5).

$$\left.\begin{array}{l}2 \rightarrow \text{"0 0 0 0 1 0"} \\ 9 \rightarrow \text{"0 0 1 0 0 0"} \\ \vdots \\ 4 \rightarrow \text{"0 0 0 1 0 0"}\end{array}\right\} \quad (5)$$

In step 702, these binary sequences are aligned to form one binary sequence which is represented by b. The binary sequence b is expressed by equation (6).

$$b=\text{"000010"} \text{"001001"} \ldots 000100" \quad (6)$$

In step 703, the binary sequence prepared in the step 702 is expanded as follows. Let the number of pixels embedded with watermark be #(A) and the number of columns (the number of bits) of the binary sequence b be #(b). Then, the number #(A) is given by equation (7).

$$\#(A)=\{\text{The number of pixels for which } S(x)=1 \text{ stands}\} \quad (7)$$

Besides, expression (8) generally stands.

$$\#(b)<<\#(A) \quad (8)$$

where << indicates that the number of figures on the right side is larger than that on the left side.

An expanded binary sequence to be actually embedded in the original image is prepared in the step 703. Firstly, the binary sequence b is added with a parity bit sequence. Any one of known various methods may be employed to prepare the parity bit sequence and to determine the number of bits. For example, the binary sequence b is divided into two columns and parities are prepared by the total of rows and columns and are defined as a parity bit sequence. Where the thus prepared parity bit sequence is p, a binary sequence indicated by a set A" is prepared pursuant to equation (9).

$$A=\{b, p, b, p, \ldots, b, p\} \quad (9)$$

This binary sequence corresponds to the expanded binary sequence representing the watermark information actually embedded in the original image. As indicated in equation (10), the number #(A) of pixels to be embedded with watermark must equal the number #(A) of columns (the number of bits) of the expanded binary sequence. The number of embedding bytes X is determined similarly.

$$\#(A)=\#(A) \ldots (10)$$

The byte number X is related to the bit number #(A") pursuant to equation (11).

$$X*(\text{The number of bits per byte}=\#(A) \quad (11)$$

Figure 8:
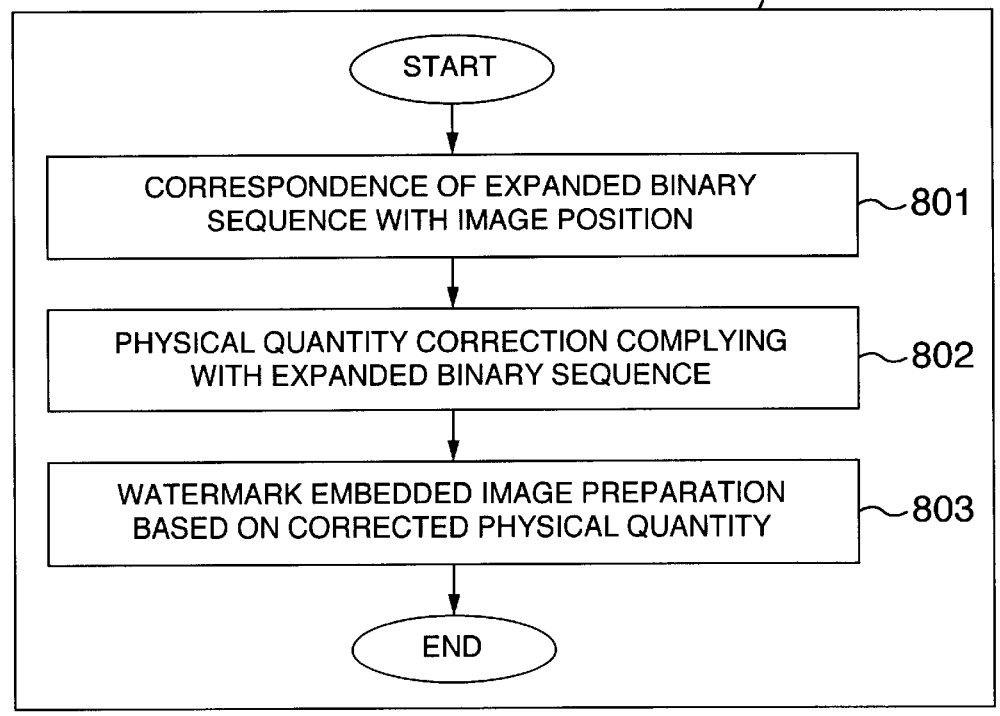
FIG. 8 shows details of watermark embedded image preparation.

Referring now to FIG. 8, a process in the watermark embedded image preparation unit 602 will be described. The watermark embedded image preparation unit 602 receives the expanded binary sequence A and the position information S. Here, the expanded binary sequence A prepared in the step 703 is used.

In step 801, the expanded binary sequence A is inputted and the correspondence of an i-th position from the head in the expanded binary sequence with a corresponding value {0, 1} of A is made, thus making the correspondence of the expanded binary sequence with the image position. When the latter correspondence is indicated by I, this correspondence I is given by equation (12).

$$I(x)=i: \text{ order of pixels } x \text{ satisfying } x \in A \quad (12)$$

The physical quantity f(x) is corrected to a corrected physical quantity F(x) which is defined by equation (13). In step 802, a corrected physical quantity F(x) to be embedded in the original image is determined in correspondence to the expanded binary sequence A. The F(x) is defined by equation (13).

$$\begin{aligned} F(x) &= f(x) \text{ (when } x \in A' \text{ or } S(x) = 0) \\ &= [f(x)/2]*2 + 1 \text{ (when } x \in A \text{ or } A(I(x)) = 1 \\ &= [f(x)/2]*2 \text{ (when } x \in A \text{ or } A(I(x)) = 0 \end{aligned} \quad (13)$$

For a pixel x, the corrected physical quantity F(x) is embedded in place of the physical quantity f(x) in the original image. Thus, for a pixel not embedded with watermark, the same physical quantity as that in the original image is retained. But F(x) at a site where the watermark is embedded branches to two, so that the pixel embedded with watermark is sequenced in accordance with the correspondence I and the physical quantity is rounded to odd number or even number in accordance with a value of {0, 1} determined by the correspondence I. This operation is not limitative and may be implemented in a different way. Here, the corrected physical quantity is so changed as to be odd number when corresponding to "1" and even number when corresponding to "0". This premises the fact that even when the physical quantity of the pixel is increased or decreased by about "1", such a change is generally indiscernible by human eyes and it does not matter to change the original image to such an extent.

In step 803, a watermark embedded image having, as pixel value, the corrected physical quantity F(x) for the pixel x is prepared.

Figure 9:
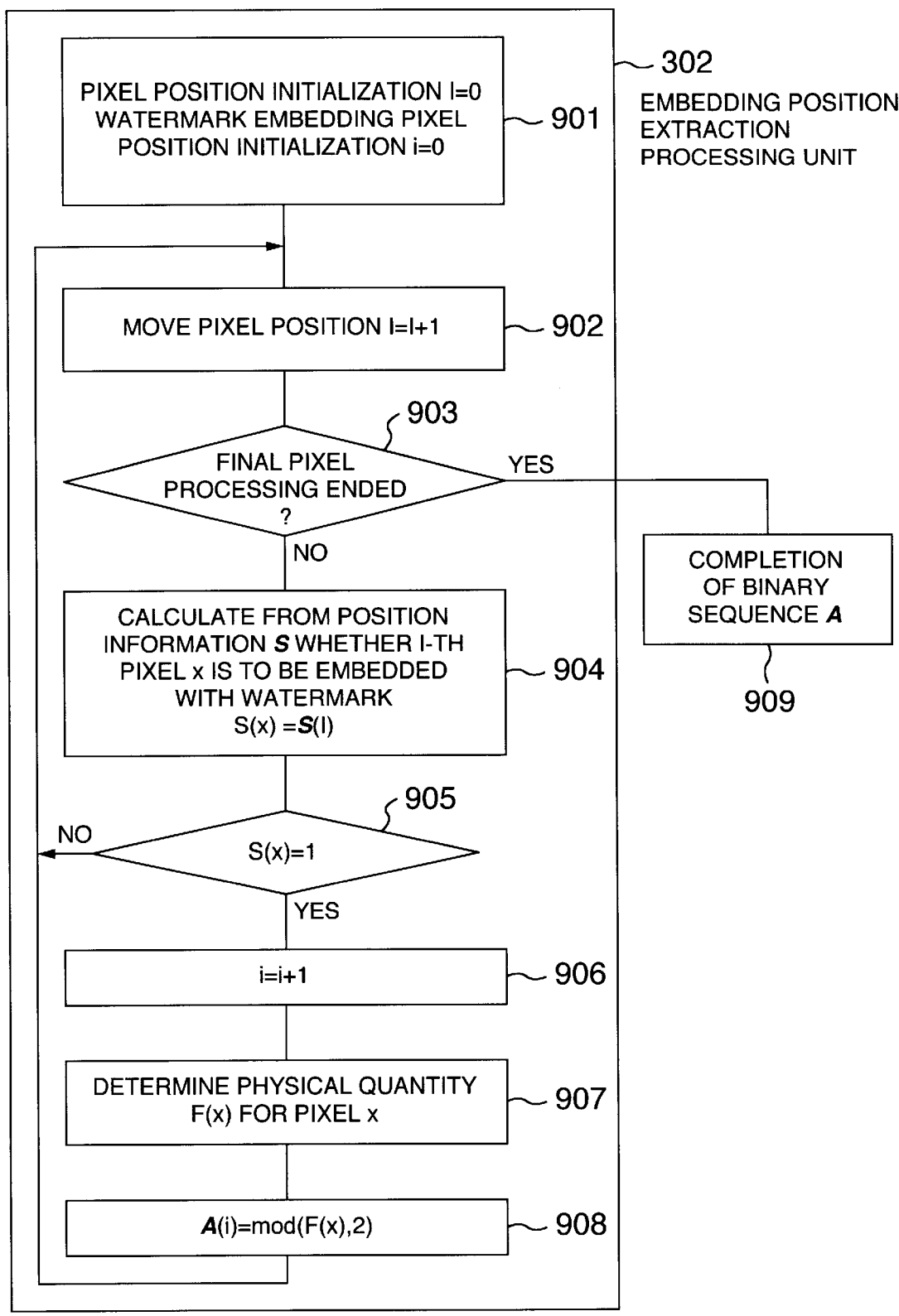
FIG. 9 is a flow chart showing an embodiment of embedding position extraction process.

Referring to FIG. 9, there is illustrated a flow chart of a process carried out in the embedding position extraction processing unit 302. In this process, an inverse operation to the operation in the watermark embedded image preparation unit 602 is carried out. Generally, the pixel position is indicated by I and the position of a pixel embedded with watermark is indicated by i. Then, in step 901, the positions I and i are initialized so as to be set to "0". In step 902, the pixel position is counted up pursuant to equation (14).

$$I=I+1 \quad (14)$$

In step 903, it is checked whether processing of the final pixel has ended. When ended, the binary sequence A representing embedded watermark information is completed (step 909). If processing of the final pixel has not ended, the program proceeds to step 904.

In the step 904, it is calculated from the position information S whether the I-th pixel x is a watermark embedded pixel or not. When the result of calculation is given by S(x), equation (15) stands.

$$S(x)=S(I) \quad (15)$$

In step 905, S(x) is checked for its value and if the value equals "1", indicating that the I-th pixel is at the watermark embedding position, the program proceeds to step 906. If not so, the pixel process concerned skips to return to the step 902.

In step 906, the watermark embedded pixel position i is counted up as shown in equation (16).

$$i=i+1 \quad (16)$$

In step 907, the physical quantity F(x) for the pixel x is obtained from the watermark embedded image.

In step 908, the binary sequence A representing the embedded watermark information is determined pursuant to equation (17).

$$A(i)=\text{mod}(F(x), 2) \quad (17)$$

where, in general, mod(a, b) indicates a residue when numeral a is divided by numeral b. When the physical quantity F(x) of the pixel x is even, A(i) is set with "0" and when odd, A(i) is set with "1". This is an inverse operation to the step 802 in FIG. 8. By repeating this operation for all pixels, the binary sequence A can be recovered.

Figure 10:
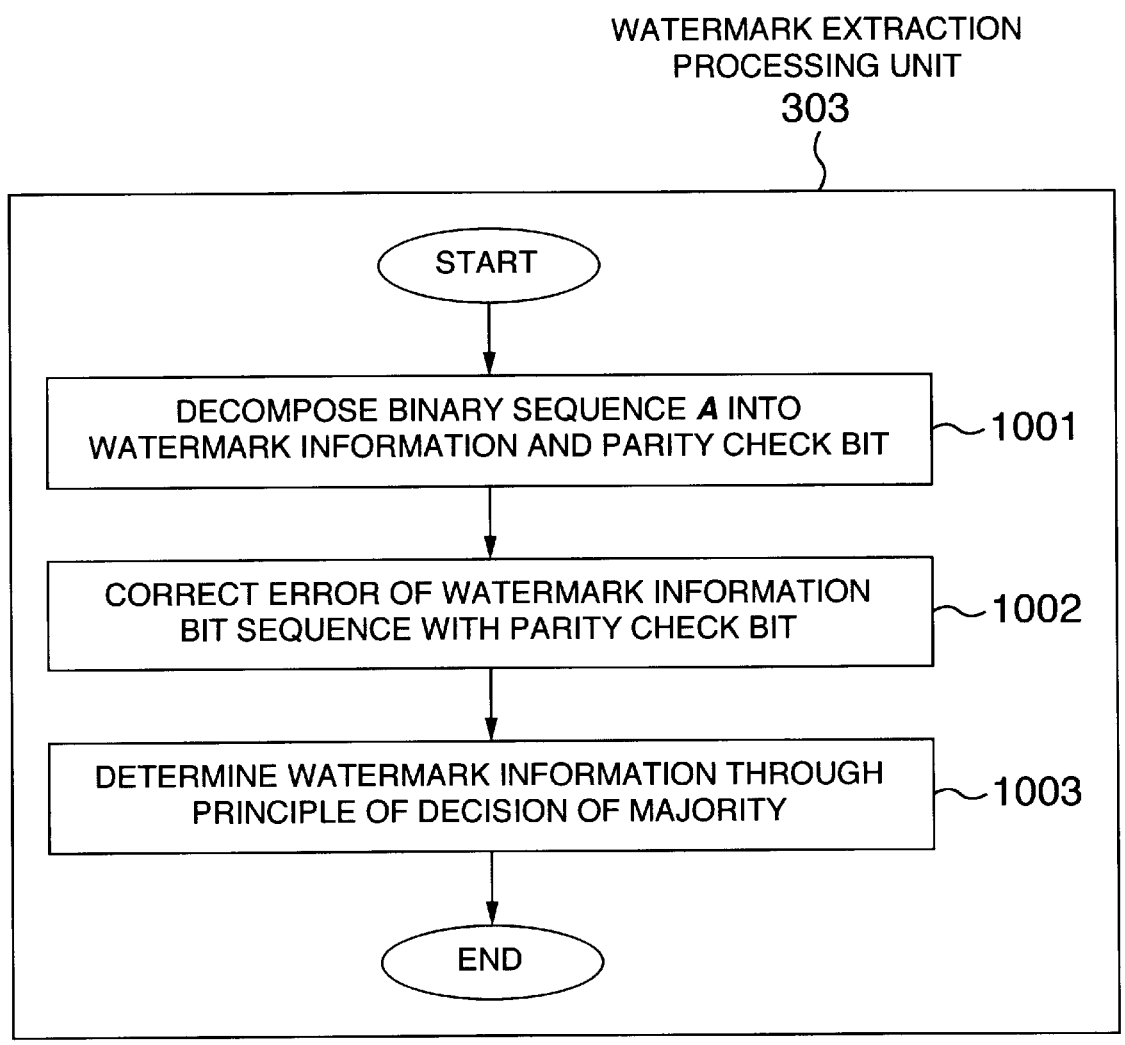
FIG. 10 shows details of a watermark extraction process.

Referring to FIG. 10, a process in the watermark extraction processing unit 303 will be described. In this unit, an inverse operation to the operation in the watermark information conversion unit 601 is carried out.

In step 1001, the binary sequence A is decomposed to obtain a binary sequence of watermark information and a parity bit sequence as shown in equation (18).

$$\begin{aligned} A &= \{b1, p1, b2, p2, \ldots, bm, pm\} \\ \# (bi) &= \#(b), \#.(pi) = \#(p) \end{aligned} \quad (18)$$

where b is the binary sequence prepared from the watermark information during watermark embedding and p is the parity check bit sequence during watermark embedding.

The column number of each of the sequences b and p is the same as that determined in the steps 702 and 703.

In step 1002, by using parity bit sequence pi for bi and pi, error correction of bi is recovered. This operation is carried out for i=1 . . . m.

In step 1003, b is restored by using the principle of decision of majority. The restored b is also designated by b. In respect of individual bit columns of each bi, larger one of the numbers of "0" and "1" is chosen to prepare corresponding individual bit columns of b. As will be seen from the above, odd number is selected as the number m of bi and pi. In this manner, an eventual binary sequence b is completed. This sequence is divided by the number of bits of symbol as shown in equation (19).

$$b=\text{"000010" "001001} \ldots \text{000100"} \quad (19)$$

From the divided bit sequence, a symbol sequence is recovered as indicated by expression (20).

$$\left.\begin{aligned} \text{"0 0 0 0 1 0"} &\to 2 \\ \text{"0 0 1 0 0 0"} &\to 9 \\ &\vdots \\ \text{"0 0 0 1 0 0"} &\to 4 \end{aligned}\right\} \quad (20)$$

In this manner, the eventual extracted watermark information "2936104" can be obtained.

Another embodiment of watermark embedding in the steganographic system according to the present invention will be described. In the present embodiment, in place of the position information described in connection with FIG. 1, a set of position information, threshold function and physical quantity is used. In the case of the present embodiment, the embedding position determining processing unit 103 shown in FIG. 1 calculates a set of position information, threshold function and physical quantity from an original image and watermark information. Only portions of the threshold function and physical quantity corresponding to the watermark embedding position are calculated. The watermark embedding processing unit 104 receives inputs of digitized position information, threshold function, physical quantity and watermark information and calculates information such as brightness necessary for preparing a watermark embedded image. The position information, threshold function and physical quantity are used in place of the original image during watermark extraction to be described later to identify the watermark embedding position. The correspondence managing unit 105 manages the correspondence of the original image with the position information, threshold function and physical quantity and is used to identify the position information, threshold function and physical quantity during extraction of a watermark from the watermark embedded image to be described later.

In an invisible watermark, information is embedded by changing the physical quantity to such an extent that the change cannot be detected by human eyes. The permissible range in which the change is indiscernible by human eyes is defined as the threshold function. Generally, a watermark embedded at a site in the image where the change of physical quantity is steep is hardly detected by human eyes and for such a site, the permissible range is widened and the value of the threshold function becomes large. Various methods for determination of the threshold function have been known. For example, in a method used for medical treatment image, steepness of the physical quantity change is calculated to determine an optimum permissible range through the technique of human engineering. According to the method, one permissible range is determined in respect of individual images to provide a threshold function.

Another embodiment of watermark extraction in the steganographic system according to the present invention will be described. In the present embodiment, a set of position information, threshold function and physical quantity is used in place of the position information explained in connection with FIG. 3. The watermark extraction input unit 301 as shown in FIG. 3 receives inputs of watermark embedded image, position information, threshold function and physical quantity and digitizes and retains them. The embedding position extraction processing unit 302 transfers, to the watermark extraction processing unit 303, embedding information extracted from the aforementioned inputs. At that time, the correspondence managing unit 105 identifies the position information, threshold function and physical quantity corresponding to the watermark embedded image. The watermark extraction processing unit 303 receives the embedding position information extracted from the embedding position extraction processing unit 302 to calculate watermark information. Only portions of the threshold function and physical quantity corresponding to the watermark embedding position are calculated.

As an example, the watermark embedding processing unit 104 shown in FIG. 6 uses a set of position information, threshold function and physical quantity in place of the position information as will be described below. The watermark embedding processing unit 104 receives inputs of watermark information, position information S, threshold function and physical quantity. The watermark information conversion unit 601 receives the watermark information, converts the watermark information into a format which is used when the watermark information is actually embedded in an original image, and transfers the converted information to the watermark embedded image preparation unit 602. Only portions of the threshold function and physical quantity corresponding to the watermark embedding position are inputted.

As an example, the watermark embedded image preparation unit 602 shown in FIG. 8 uses a set of position information, threshold function and physical quantity in place of the position information as will be described below. The watermark embedded image preparation unit 602 receives inputs of binary sequence A and position information, threshold function and physical quantity. Only portions of the threshold function and physical quantity corresponding to the watermark embedding position are inputted. The binary sequence A prepared in the step 703 of FIG. 7 is used herein.

In the step 802, a corrected physical quantity to be embedded in the original image is determined. The corrected physical quantity F(x) is defined by equation (21).

$$F(x) = f(x) \text{ (when } x \in A' \text{ i.e. } S(x) = 0) \\ = f_S(x) \text{ (when } x \in A \text{ and } A(I(x) = 1) \\ = f(x) \text{ (when } x \in A \text{ and } A(I(x)) = 0) \\ \text{where } f_S \text{ is a function satisfying the} \\ \text{following relation:} \\ f(x) - h_S(x) < f_S(x) \leq f(x) - h \cdot h_S(x) \\ \text{or} \\ f(x) + h \cdot h_S(x) \leq f_S(x) < f(x) + h_S(x) \\ \text{where } 0 < h < 1. \tag{21}$$

In place of the physical quantity f(x) for the pixel x in the original image, the corrected physical quantity F(x) is embedded. Thus, for a pixel not embedded with watermark, the same physical quantity as that in the original image is retained. Corrected physical quantity F(x) at a site where the watermark is embedded branches to two, so that pixels to be embedded with watermark is sequenced in accordance with the correspondence I and the following is taken in accordance with a value of {0, 1} determined by the correspondence I. In the case of "0", the corrected physical quantity is the same as the physical quantity in the original image. In the case of "1", by using a parameter h which is defined as 0<h<1, function $f_S$ is defined which is distant from the physical quantity of the original image by not less than h times the threshold function $h_S$ and by less than one times the threshold function and the original physical quantity is replaced with $f_S$. This premises the fact that even when the physical quantity for the pixel is increased or decreased by a value which is less than the threshold function, the increase or decrease is indiscernible by human eyes and it does not matter to apply the change to such an extent to the original image.

Figure 11:
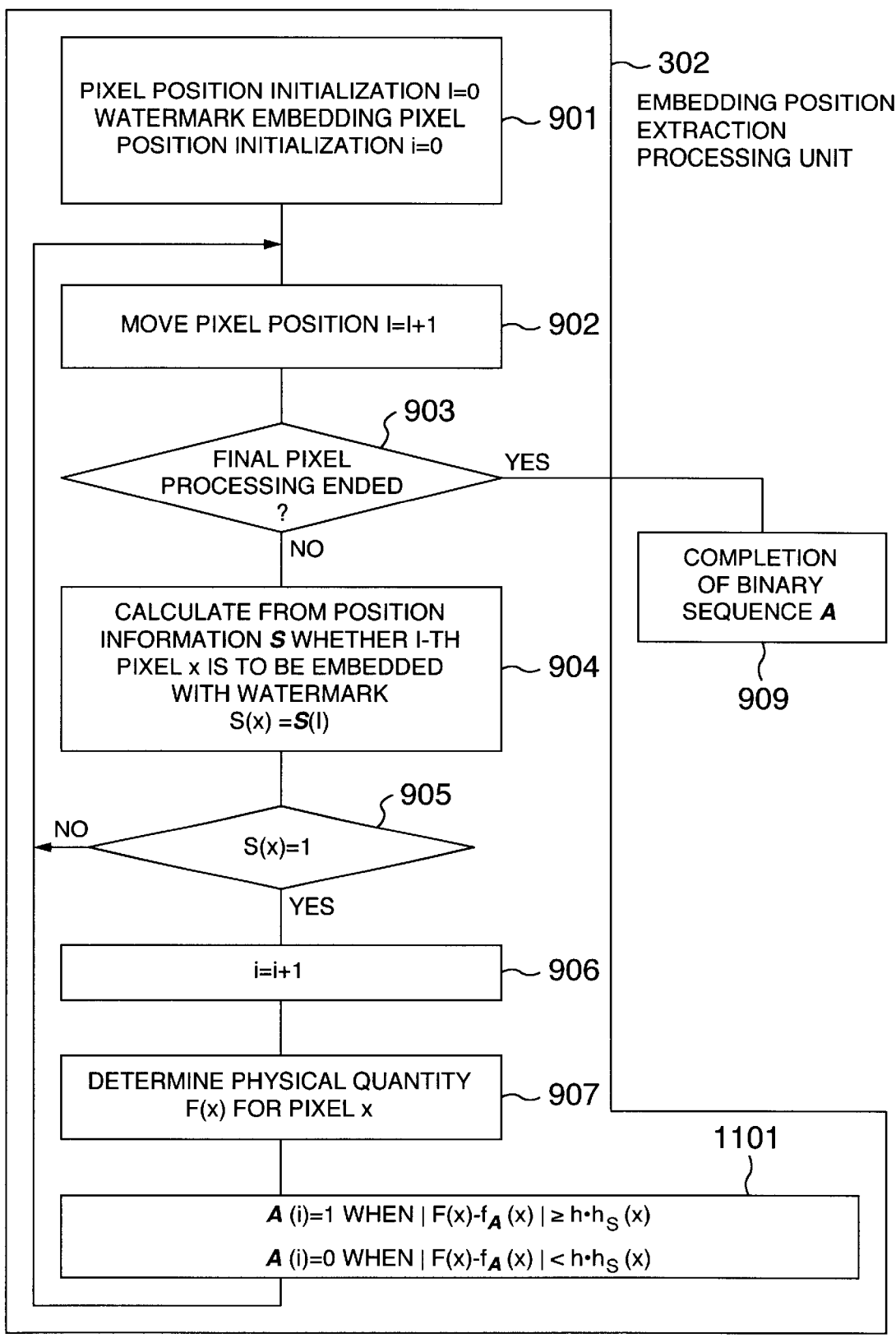
FIG. 11 is a flow chart showing another embodiment of embedding position extraction process.

Referring to FIG. 11, there is illustrated a flow chart of a process in the embedding position extraction unit 302 when a set of position information, threshold function and physical quantity is used in place of the position information shown in FIG. 9. The operation in this process is inverse to the operation in the watermark embedded image preparation unit 602 explained in connection with FIG. 8 in which the position information, threshold function and physical quantity are used in place of the position information. Steps 901 to 907 are the same as those in FIG. 9.

In step 1101, a binary sequence A representing embedded watermark information is determined pursuant to equation (22).

$$A(i) = 1 \text{ (when } |F(x) - f_A(x)| \geq h \cdot h_S(x)) \\ = 0 \text{ (when } |F(x) - f_A(x)| < h \cdot h_S(x))$$
(22)

where $f_A$ represents a physical quantity at a portion corresponding to the watermark embedding position. When the physical quantity F(x) of the pixel x is distant from the original physical quantity by only less than h times the threshold function, "0" is set to A(i) but when distant by not less than h times the threshold function, "1" is set to A(i). By repeating this operation for all pixels, the binary sequence A can be restored (step 909).

Still another embodiment of watermark embedding in the steganographic system according to the invention will be described below. In the present embodiment, in place of the position information explained in connection with FIG. 1, a set of position information, threshold function, physical quantity and initial circumference quantity is used. In the case of the present embodiment, the embedding position determining processing unit 103 as shown in FIG. 1 calculates, from an original image and watermark information, the position information, threshold function, physical quantity and initial circumference quantity. Only portions of the threshold function, physical quantity and initial circumference quantity corresponding to the watermark embedding position are calculated. The watermark embedding processing unit 104 receives inputs of digitized position information, threshold function, physical quantity, initial circumference quantity and watermark information to calculate information such as brightness necessary to prepare a watermark embedded image. The position information, threshold function, physical quantity and initial circumference quantity are used in place of the original image to identify the watermark embedding position during watermark extraction to be described later. The correspondence managing unit 105 manages the correspondence of the original image with the position information, threshold function, physical quantity and initial circumference quantity and is used to identify the position information, threshold function, physical quantity and initial circumference quantity during extraction of a watermark from the watermark embedded image to be described later.

The circumference quantity is a mean value of physical quantities at pixels adjoining each pixel. Where pixels $x_1, \ldots, x_{1k}$ adjoin a pixel x, circumferenc quantity $F_S$ of physical quantity F is calculated pursuant to equation (23).

$$F_S(x) = (F(x_1) + \ldots F(x_k))/k$$
(23)

It is assumed that initial circumference quantity $F_{SO}$ is a circumference quantity calculated in association with the original image pursuant to equation (23).

Still another embodiment of watermark extraction in the steganographic system according to the invention will be described. In the present embodiment, in place of the position information explained in connection with FIG. 3, a set of position information, threshold function, physical quantity and initial circumference quantity is used. In the case of the present embodiment, the watermark extraction input unit 301 as shown in FIG. 3 receives inputs of watermark embedded image, position information, threshold function, physical quantity and initial circumference quantity and digitizes and retains them. The embedding position extraction processing unit 302 transfers, to the watermark extraction processing unit 303, embedding position information extracted from the aforementioned inputs. At that time, the correspondence managing unit 105 identifies the position information, threshold function, physical quantity and initial circumference quantity corresponding to the watermark embedded image. The watermark extraction processing unit 303 receives the embedding position information extracted from the embedding position extraction processing unit 302 to calculate watermark information. Only portions of the threshold function, physical quantity and initial circumference quantity corresponding to the watermark embedding position are calculated.

An example will be described in which a set of position information, threshold function, physical quantity and initial circumference quantity are used in place of the position information of the watermark embedding processing unit 104 of FIG. 6. The watermark embedding processing unit 104 receives inputs of watermark information, position information S, threshold function, physical quantity and initial circumference quantity. The watermark information conversion unit 601 receives the watermark information, converts the watermark information into a format used when the watermark information is actually embedded in the original image and transfers the converted watermark information to the watermark embedded image preparation unit 602. Only portions of the threshold function, physical quantity and initial circumference quantity corresponding to the watermark embedding position are inputted.

An example will be described in which a set of position information, threshold function, physical quantity and initial circumference quantity is used in place of the position information in the watermark embedded image preparation unit 602 of FIG. 8. The watermark embedded image preparation unit 602 receives inputs of a binary sequence A and the position information, threshold function, physical quantity and initial circumference quantity. Only portions of the threshold function, physical quantity and initial circumference quantity corresponding to the watermark embedding position are inputted. The binary sequence A prepared in the step 703 of FIG. 7 is used.

In the step 802, a corrected physical quantity to be embedded in an original image is determined. The corrected physical quantity F(x) is defined by the equation (21). In place of the physical quantity f(x) for the pixel x in the original image, the corrected physical quantity F(x) is embedded. Thus, for a pixel not embedded with watermark, the same physical quantity as that in the original image is retained. Corrected physical quantity F(x) at a site where the watermark is embedded branches to two, so that pixels to be embedded with watermark is sequenced in accordance with the correspondence I and the following is taken in accordance with a value of {0, 1} determined by the correspondence I. In the case of "0", the corrected physical quantity is the same as the physical quantity in the original image. In the case of "1", by using a parameter h which is defined as 0<h<1, function $f_S$ is defined which is distant from the physical quantity of the original image by not less than h times the threshold function $h_S$ and by less than one times (or by a fraction of) the threshold function and the original physical quantity is replaced with $f_S$. This premises the fact that even when the physical quantity for the pixel is increased or decreased by a value which is less than the threshold function, the increase or decrease is indiscernible by human eyes and it does not matter to apply the change to such an extent to the original image.

Figure 12:
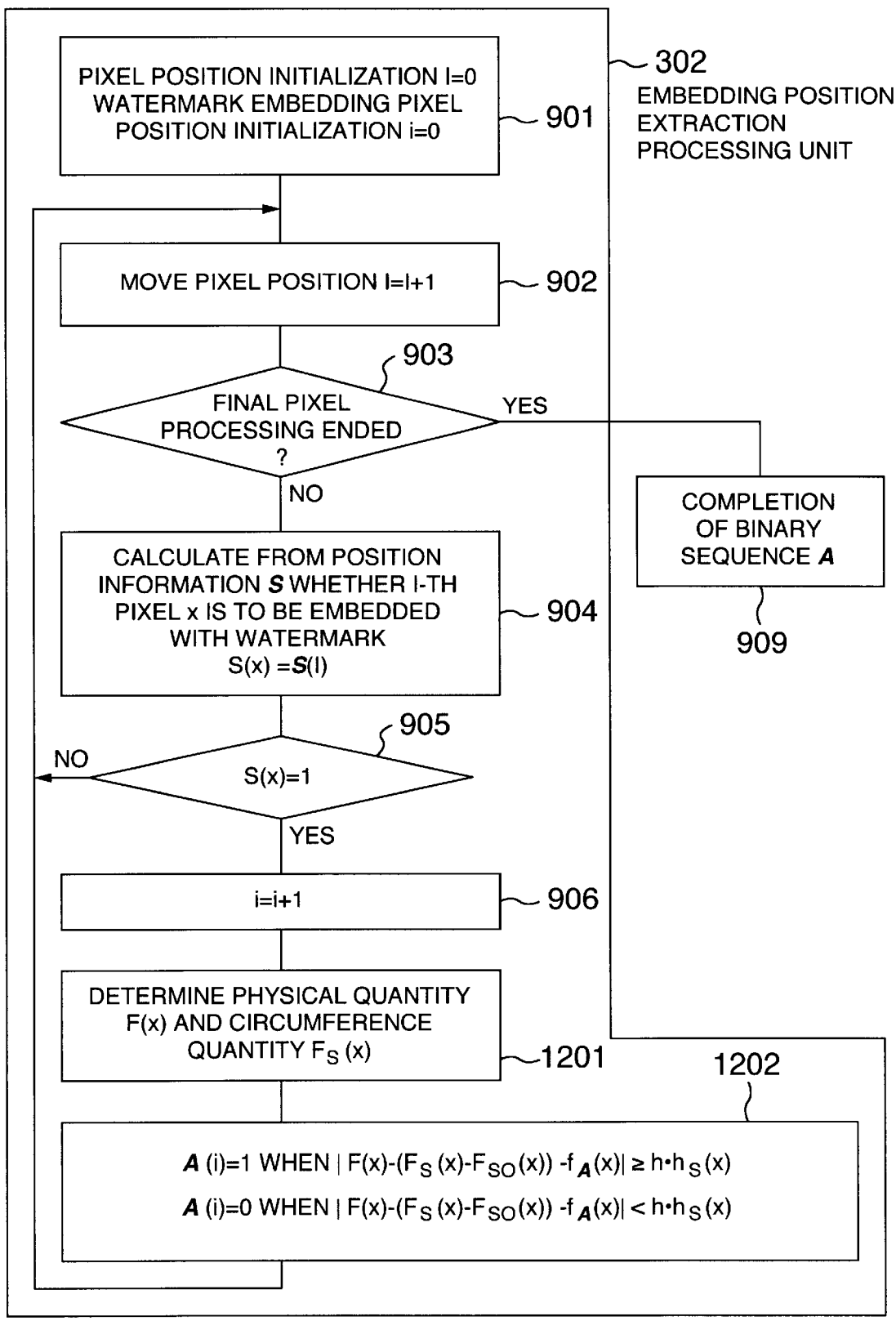
FIG. 12 is a flow chart showing still another embodiment of embedding position extraction process.

Referring to FIG. 12, there is illustrated a flow chart of a process in the embedding position extraction processing unit 302 when a set of position information, threshold function, physical quantity and initial circumference quantity is used in place of the position information shown in FIG. 9. The operation in this process is inverse to the operation in the watermark embedded image preparation unit 602 explained in connection with FIG. 8 in which the position information, threshold function, physical quantity and initial circumference quantity are used in place of the position information. Steps 901 to 906 are the same as those in FIG. 9.

In step 1201, a physical quantity F(x) for a pixel x is obtained from a watermark embedded image. A circumference quantity $F_S$ is obtained form the watermark embedded image pursuant to the equation (23).

In step 1202, a binary sequence A representing embedded watermark information is determined pursuant to equation (24).

$$A(i) = 1 \ (\text{when } |F(x) - (F_S(x) - F_{SO}(x)) - f_A(x)| \geq h \cdot h_S(x))$$
$$= 0 \ (\text{when } |F(x) - (F_S(x) - F_{SO}(x)) - f_A(x)| < h \cdot h_S(x)) \quad (24)$$

where $f_A$ represents the physical quantity at a site corresponding to the watermark embedding position. $F_{SO}$ represents an initial circumference quantity concerning the inputted watermark embedding position. Difference $F_S - F_{SO}$ between the circumference quantity $F_S$ and the initial circumference quantity $F_{SO}$ represents correction when the watermark embedded image undergoes a change in physical quantity. When the physical quantity F(x) for the pixel x after the correction is distant from the original physical quantity by only less than h times the threshold function, "0" is set to A(i) but when distant by not less than h times the threshold function, "1" is set to A(i). By repeating this operation for all pixels, the binary sequence A can be restored (step 909).

An example of the correspondence management in the unit 105 of FIG. 1 is shown in FIG. 13. Watermark embedded image file name 1301 and position information field 1302 are managed in table form. When a watermark embedded image is acquired, corresponding watermark embedding position information can be obtained from this table by way of the file name.

Another example of the correspondence management in the unit 105 of FIG. 1 is shown in FIG. 14. Watermark embedded image file name 1401 and field 1402 of position information, threshold function at a watermark embedded position and physical quantity are managed in a table form. When a watermark embedded image is acquired, the position information, threshold function at a watermark embedded position and physical quantity can be obtained from this table by way of the file name.

Still another example of the correspondence management in the unit 105 of FIG. 1 is shown in FIG. 15. Watermark embedded image file name 1501 and field 1502 of position information, threshold function at a watermark embedded position, physical quantity and initial circumference quantity are manage in a table form, so that when a watermark embedded image is acquired, the position information, threshold function at a watermark embedded position, physical quantity and initial circumference quantity can be obtained from this table by way of the file name.

Figure 16:
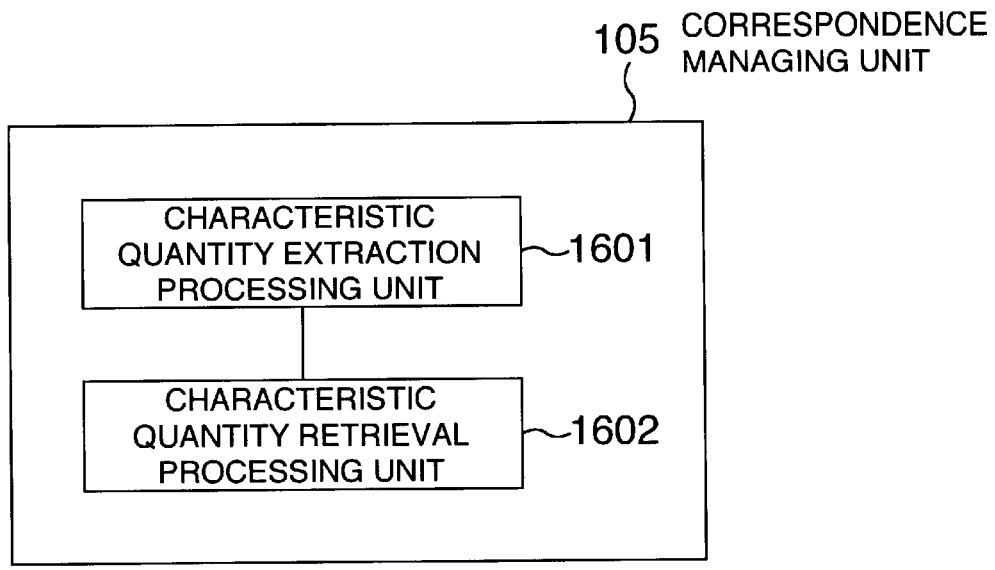
FIG. 16 is a diagram showing the construction of a correspondence managing unit.

Referring to FIG. 16, another example of construction of the correspondence managing unit 105 of FIG. 1 is shown. Various characteristic quantities are almost the same for the original image and the watermark embedded image. The unit 105 utilizes this point and comprises a characteristic quantity extraction processing unit 1601 and a characteristic quantity retrieval processing unit 1602.

Figure 17:
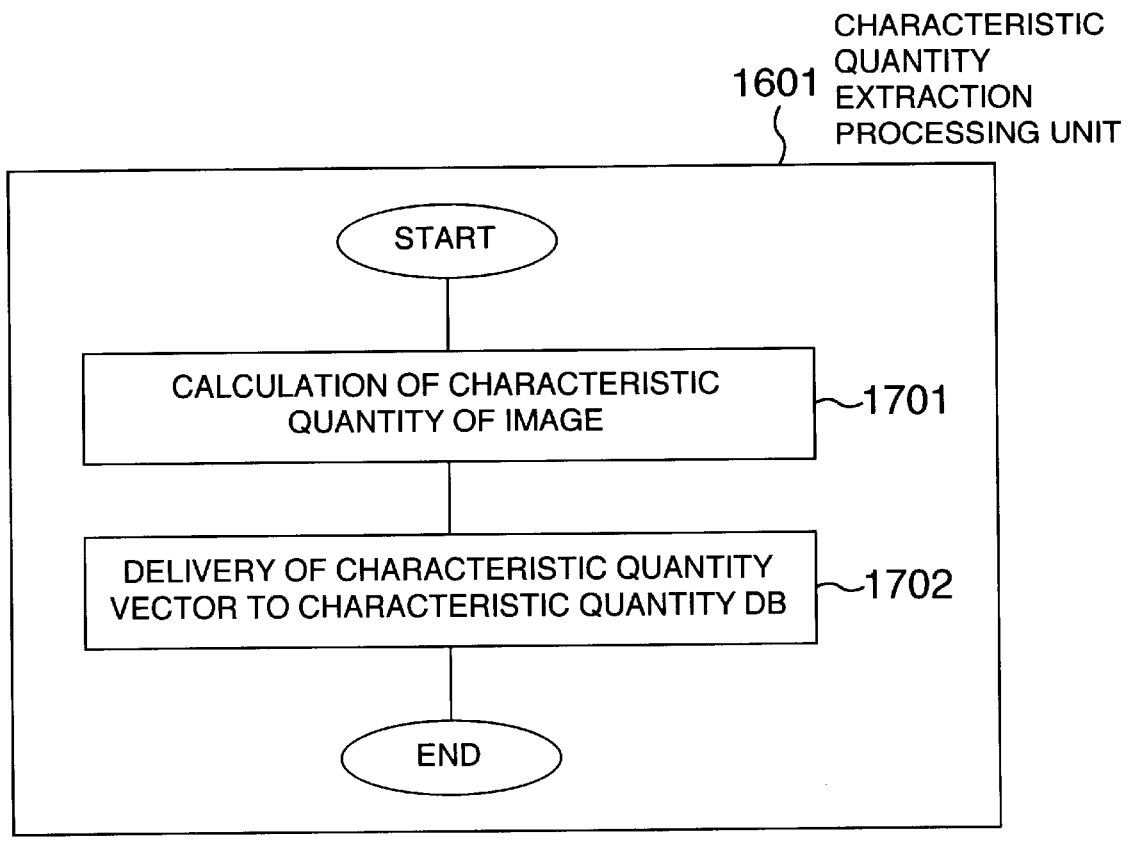
FIG. 17 shows details of a characteristic extraction process.

Operation in the characteristic quantity extraction processing unit 1601 is detailed in FIG. 17. In step 1701, a characteristic quantity vector of a watermark embedded image is calculated from the watermark embedded image. The characteristic quantity is an index for featuring the image and an example of a method of determining the characteristic quantity will be described later.

In step 1702, the calculated characteristic quantity vector is delivered to a characteristic quantity database.

Figure 18:
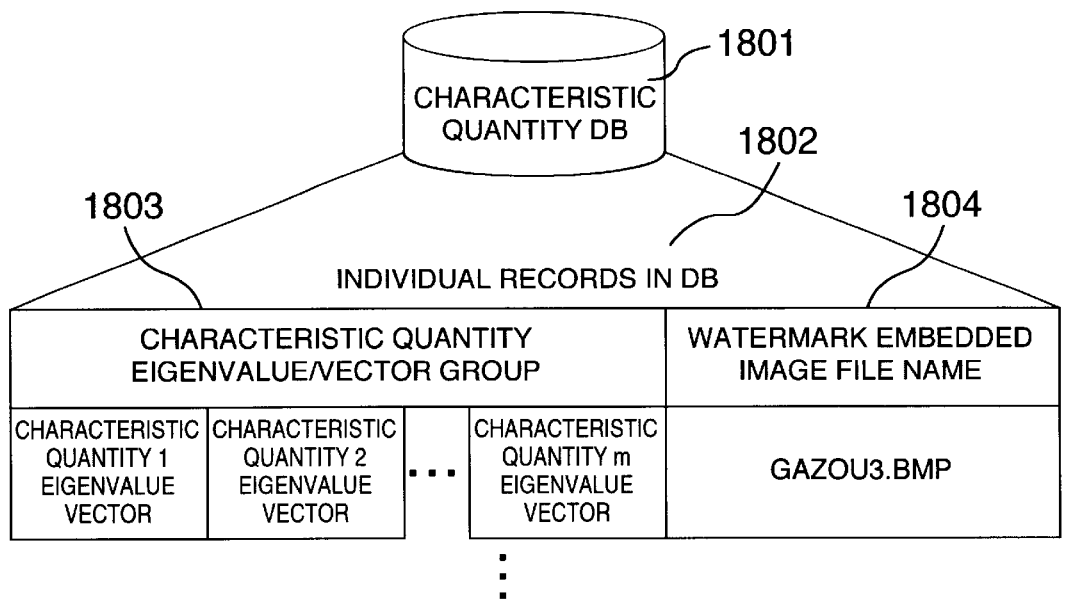
FIG. 18 is a diagram showing the construction of a characteristic quantity database.

Referring to FIG. 18, there is illustrated an example of construction of the characteristic quantity database. Each record 1802 in a characteristic quantity database 1801 includes characteristic quantity eigenvalue/vector group 1803 and watermark embedded image name file 1804. The characteristic quantity eigenvalue/vector group 1803 consists of m eigenvalues and m characteristic vectors corresponding to m characteristic quantities which express the image.

Figure 19:
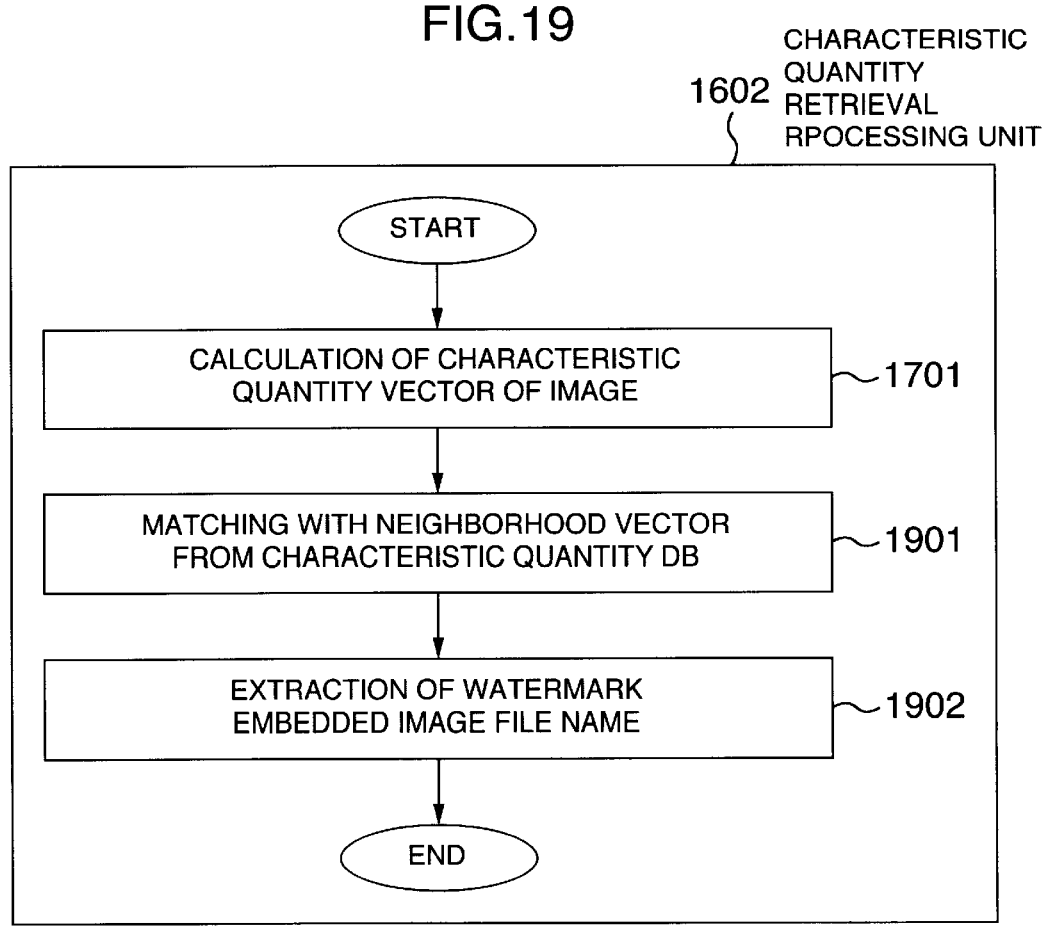
FIG. 19 shows details of a characteristic quantity retrieval process.

Referring to FIG. 19, a process in the characteristic quantity retrieval processing unit 1602 will be described. Step 1701 is the same as the step 17 of FIG. 17 and in this step, a characteristic quantity vector of an image is calculated.

In step 1901, a neighborhood vector having a characteristic quantity vector most approximating the characteristic quantity vector of the watermark embedded image is retrieved from the characteristic quantity database.

In step 1902, a watermark embedded image file name corresponding to the thus obtained neighborhood vector is obtained.

Figure 20:
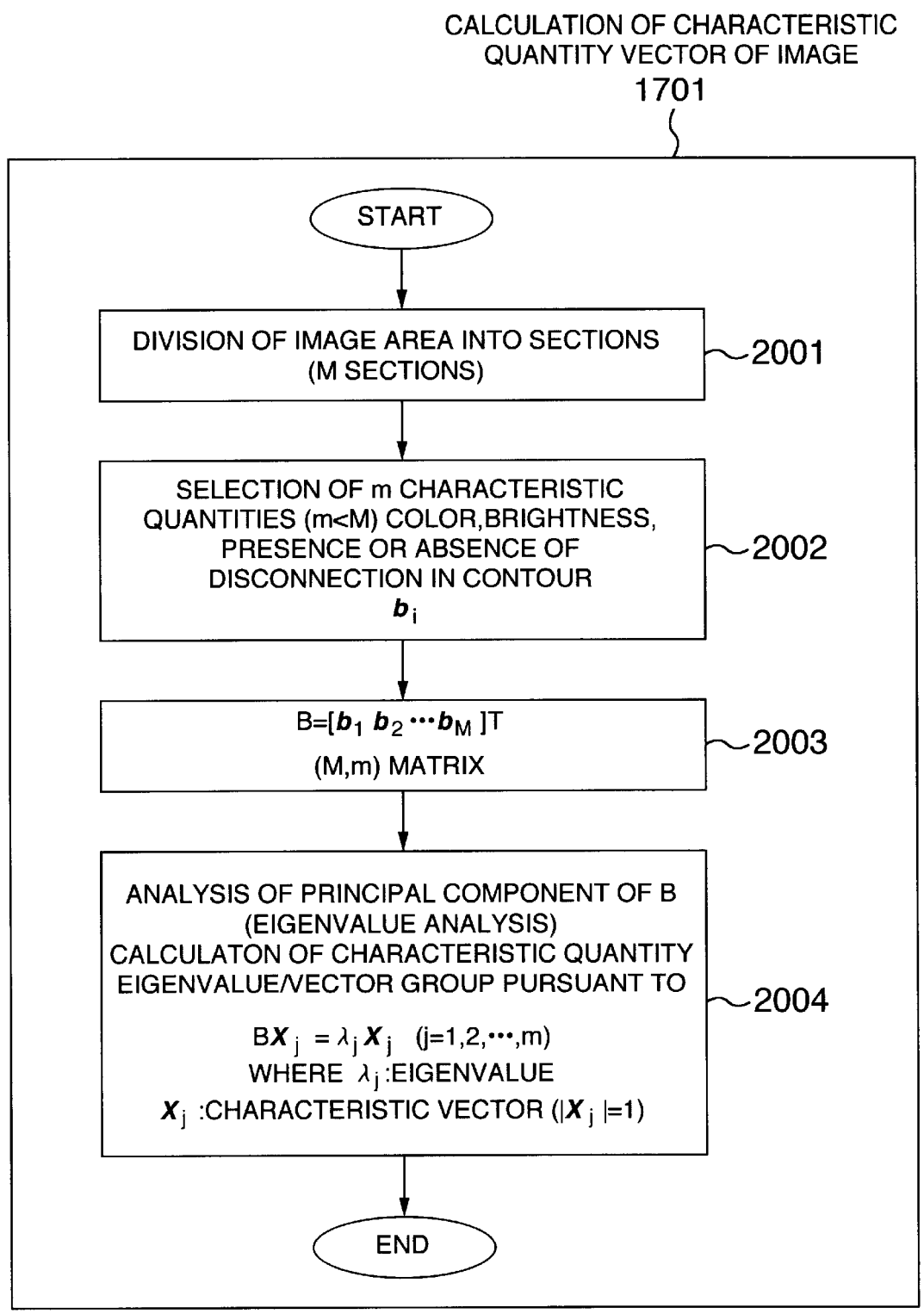
FIG. 20 is a flow chart showing calculation of characteristic vector of an image.

Referring to FIG. 20. details of the step 1701 for calculation of characteristic vectors of the image will be described. In step 2001, the area of the image is divided into M sections. The number M is determined in such a manner that when m characteristic quantities are provided, each section is grained to such an extent that each section can be featured by a characteristic quantity. Normally, m is set to be smaller than M. In step 2002, m characteristic quantities are chosen which are represented by vector $b_i$, where i indicates a section number.

In step 2003, $b_i$'s are collected to form a B-matrix given by equation (25). The B-matrix is a matrix of (M, m) type and T is a transposed matrix.

$$B = [b_1 b_2 \ldots b_M]T \quad (25)$$

In step 2004, in order to avoid the dependency on the manner of section dividing as far as possible, analysis of principal components is carried out through eigenvalue analysis pursuant to equation (26).

$$Bx_j = \lambda_j x_j \quad (26)$$

(j=1, 2, . . . , m)
where
 $\lambda_j$: eigenvalue
 $x_j$: characteristic vector
 $|x_j|=1$)

Eigenvalues, m in number, hardly depend on the manner of section dividing. As the section division becomes thinner, the individual eigenvalues converge to constant values. A physical quantity corresponding to the maximum eigenvalue exhibits most eminently the characteristic of the image. The thus obtained m eigenvalues and characteristic vectors are registered as the characteristic quantity eigenvalue/vector group 1803 in the record 1802, along with the watermark embedded image file name 1804.

Figure 21:
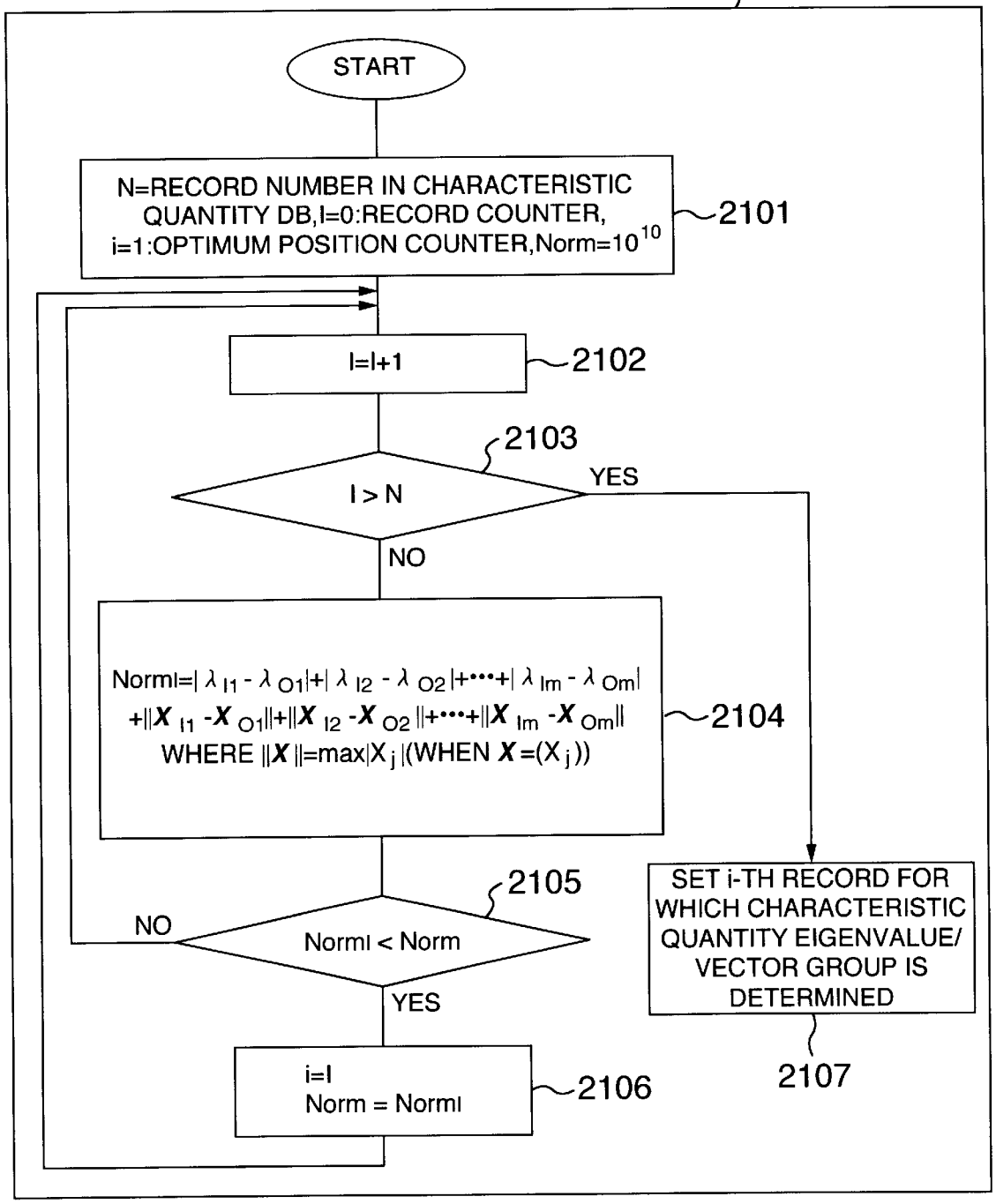
FIG. 21 is a flow chart showing a matching process of a neighborhood vector from the characteristic quantity database.

Referring to FIG. 21, a flow chart shows details of matching with the neighborhood vector from the characteristic quantity database. In step 2101, the number of records in the characteristic quantity database is set to N and initial values of record counter I and optimum position counter i are set as indicated in equation (27). Similarity of the characteristic quantity eigenvalue/vector group is represented by norm. As an initial value of norm, a large value of $10^{10}$ such as indicated in equation (27) is set.

$$\text{Norm}=10^{10} \tag{27}$$

when N: the number of records in characteristic quantity DB

I=0: record counter i=1: optimum position counter

In step 2102, the record counter I in the characteristic quantity database is updated pursuant to equation (28).

$$I=I+1 \tag{28}$$

In step 2103, the record counter is checked to determine whether a record to be processed exists in the characteristic quantity database. If the record counter I exceeds the record number N in the characteristic quantity database, it is determined that no record to be processed exists and the program proceeds to step 2107.

In the presence of a record to be processed, norm representing the degree of approximation of the characteristic quantity eigenvalue/vector group of record I to that of an input image, the norm being designated by $\text{norm}_I$, is calculated pursuant to equation (29).

$$\text{Norm}_I = |\lambda_{I1}-\lambda_{O1}|+|\lambda_{I2}-\lambda_{O2}|+ \ldots +|\lambda_{Im}-\lambda_{Om}|+\|x_{I1}-x_{O1}\|+ \\ \|x_{I2}-x_{O2}\|+ \ldots +\|x_{Im}-x_{Om}\| \text{ where } \|x\|=\max |x_j| \\ (\text{when } x=(x_j)) \tag{29}$$

where $\|x\|$ represents the length (also one norm) of vector x. The length may be given by a square root of square sum of components but here it is indicated by an absolute value of absolute value maximum component. As indicated by expression (30), the norm is mapping from vector space to non-negative real number and is defined such that norm of the sum does not exceed the sum of norms.

$$\|x\| \geq 0, \ \|x+y\| \leq \|x\|+\|y\| \tag{30}$$

In step 2105, the norm is compared with the $\text{norm}_I$. If the $\text{norm}_I$ is smaller than the norm, it is determined that the record I is more approximate to the input characteristic quantity eigenvalue/vector group and its record number is determined to be i and its $\text{norm}_I$ is substituted to norm. Then, the program returns to the step 2102 and proceeds to the next record processing. If not so, the program directly returns to the step 2102 and proceeds to the next record processing.

By using any one of the correspondence management table of FIGS. 13, 14 and 15, a watermark embedded image file name corresponding to the necessary position information, threshold function, physical quantity and initial circumference quantity can be obtained from the thus determined characteristic quantity eigenvalue/vector group.

What is claimed is:

1. An information processing system comprising:
   an information managing table for storing position information embedded in an image to be embedded with a watermark in correspondence with said image; and
   a controller for controlling at least one of watermark embedding and extraction positions in said image on the basis of said position information in said information managing table,
   wherein said controller extracts the watermark from said image at a location corresponding to said position information received from said information managing table; and
   wherein said controller determines the watermark embedding position by calculating the relation between a value of steepness of a change of physical quantity owned by a pixel of said image and a value of a function indicative of an undetectable permissible range, at a location corresponding to said position information received from said information managing table.

2. An information processing system according to claim 1, wherein said information managing table further stores at least one of a threshold function at a watermark embedded position and a physical quality owed by individual pixel of said image, to be used to identify the watermark embedding position in a watermark embedded image during watermark extraction from said image.

3. An information processing system according to claim 1, wherein said information managing table further stores at least one of a threshold function at a watermark embedded position, a physical quality owed by individual pixel of said image, and an initial circumference quality indicating a mean value of physical qualities at pixels adjoining each pixel of said image, to be used to identify the watermark embedding position in a watermark embedded image during watermark extraction from said image.

4. An information processing system according to claim 1, wherein said controller determines the embedding position of a watermark by avoiding pixel positions corresponding to maximal and minimal values of a physical quantity owned by a pixel of said image.

5. A steganographic method comprising:
   storing, in an information managing table, watermark position information embedded in an image to be embedded with a watermark in correspondence to said image; and
   controlling at least one of watermark embedding and extraction positions in said image on the basis of said position information in said information managing table, including extracting the watermark from said image at a location corresponding to said position information received from said information managing table, and determining the watermark embedding position by calculating the relation between a value of steepness of a change of physical quantity owned by a pixel of said image and a value of a function indicative of an undetectable permissible range, at the location corresponding to said position information received from said information managing table.

6. A steganographic method according to claim 5, wherein said information managing table further stores at least one of a threshold function at a watermark embedded position and a physical quality owed by individual pixel of said image, to be used to identify the watermark embedding position in a watermark embedded image during watermark extraction from said image.

7. A steganographic method according to claim 5, wherein said information managing table further stores at least one of a threshold function at a watermark embedded position, a physical quality owed by individual pixel of said image, and an initial circumference quality indicating a mean value of physical qualities at pixels adjoining each pixel of said image, to be used to identify the watermark embedding position in a watermark embedded image during watermark extraction from said image.

8. A steganographic method according to claim 5, wherein the embedding position of a watermark is determined by avoiding pixel positions corresponding to maximal and minimal values of a physical quantity owned by a pixel of said image.

9. A storage medium for storing a watermark control program which, when executed by an information processing system, causes the information processing system to perform the following:

storing, in an information managing table, watermark position information embedded in an image to be embedded with a watermark in correspondence to said image; and controlling at least one of watermark embedding and extraction positions in said image on the basis of said position information in said information managing table, including extracting the watermark from said image at a location corresponding to said position information received from said information managing table, and determining the watermark embedding position by calculating the relation between a value of steepness of a change of physical quantity owned by a pixel of said image and a value of a function indicative of an undetectable permissible range, at the location corresponding to said position information received from said information managing table.

10. A storage medium according to claim 9, wherein said information managing table further stores at least one of a threshold function at a watermark embedded position and a physical quality owed by individual pixel of said image, to be used to identify the watermark embedding position in a watermark embedded image during watermark extraction from said image.

11. A storage medium according to claim 9, wherein said information managing table further stores at least one of a threshold function at a watermark embedded position, a physical quality owed by individual pixel of said image, and an initial circumference quality indicating a mean value of physical qualities at pixels adjoining each pixel of said image, to be used to identify the watermark embedding position in a watermark embedded image during watermark extraction from said image.

12. A storage medium according to claim 9, wherein the watermark embedding position is alternatively determined by avoiding pixel positions corresponding to maximal and minimal values of a physical quantity owned by a pixel of said image.

13. A watermark control program for an information processing system, comprising:

an information managing table for storing watermark position information embedded in an image to be embedded with a watermark in correspondence to said image; and a routine for controlling at least one of watermark embedding and extraction positions in said image on the basis of said position information in said information managing table, including extracting the watermark from said image at a location corresponding to said position information received from said information managing table, and determining the watermark embedding position by calculating the relation between a value of steepness of a change of physical quantity owned by a pixel of said image and a value of a function indicative of an undetectable permissible range, at the location corresponding to said position information received from said information managing table.

14. A watermark control program according to claim 13, wherein said information managing table further stores at least one of a threshold function at a watermark embedded position and a physical quality owed by individual pixel of said image, to be used to identify the watermark embedding position in a watermark embedded image during watermark extraction from said image.

15. A watermark control program according to claim 13, wherein said information managing table further stores at least one of a threshold function at a watermark embedded position, a physical quality owed by individual pixel of said image, and an initial circumference quality indicating a mean value of physical qualities at pixels adjoining each pixel of said image, to be used to identify the watermark embedding position in a watermark embedded image during watermark extraction from said image.

16. A watermark control program according to claim 13, further comprising a routine for determining the watermark embedding position by avoiding pixel positions corresponding to maximal and minimal values of a physical quantity owned by a pixel of said image.

* * * * *